United States Patent [19]

Funada et al.

[11] Patent Number: 4,486,760
[45] Date of Patent: Dec. 4, 1984

[54] LIQUID CRYSTAL DISPLAY/RECORD CELL

[75] Inventors: Fumiaki Funada, Yamatokoriyama; Masataka Matsuura, Tenri; Tomio Wada, Nara, all of Japan

[73] Assignee: Sharp Kabushiki Kaisha, Osaka, Japan

[21] Appl. No.: 455,272

[22] Filed: Jan. 3, 1983

Related U.S. Application Data

[63] Continuation of Ser. No. 236,518, Feb. 20, 1981, abandoned.

[30] Foreign Application Priority Data

Feb. 21, 1980 [JP] Japan ................................. 55-21464

[51] Int. Cl.$^3$ .............................................. G02B 5/17
[52] U.S. Cl. ............................ 346/107 R; 350/96.27; 350/334
[58] Field of Search .................... 346/107 R; 354/106; 350/334, 345, 96.27, 352

[56] References Cited

U.S. PATENT DOCUMENTS

| 4,183,630 | 1/1980 | Funada et al. | 350/96.27 |
| 4,196,973 | 4/1980 | Hockstrate | 350/345 |
| 4,291,947 | 9/1981 | Cerkler et al. | 350/334 |

FOREIGN PATENT DOCUMENTS 2710735 9/1978 Fed. Rep. of Germany ...... 354/106

OTHER PUBLICATIONS

*Electronics International,* "Fluoroescent 350-345 Plastic Light Source Brightens LCD", vol. 50, No. 12, 6/9/77.

*Primary Examiner*—A. D. Pellinen
*Assistant Examiner*—Todd E. DeBoer
*Attorney, Agent, or Firm*—Birch, Stewart, Kolasch & Birch

[57] ABSTRACT

A photosensitive recording member is disposed above a twisted nematic field effect mode liquid crystal display cell for recording a light image formed by the twisted nematic field effect mode liquid crystal display cell. At least one of substrates which confronts the photosensitive recording member is made of a fiber plate including a plurality of optical fibers of which axes are perpendicular to the plane of a liquid crystal layer of the twisted nematic field effect mode liquid crystal display cell.

3 Claims, 2 Drawing Figures

LIQUID CRYSTAL DISPLAY/RECORD CELL

This application is a continuation of copending application Ser. No. 236,518, filed on Feb. 20, 1981, now abandoned.

BACKGROUND AND SUMMARY OF THE INVENTION

The present invention relates to a recording system utilizing a liquid crystal display cell.

The present inventors have developed a recording system which utilizes an optical modulation generated by a twisted nematic liquid crystal. In such a system, it is difficult to ensure a high contrast recording because of the viewing angle dependency of the conventional twisted nematic field effect mode liquid crystal display cell.

Accordingly, an object of the present invention is to provide a novel recording system employing a twisted nematic field effect mode liquid crystal display cell.

Another object of the present invention is to enhance the recording contrast in a recording system employing a twisted nematic field effect mode liquid crystal display cell.

Other objects and the further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a photosensitive recording film such as the conventional silver salt film is disposed on a twisted nematic field effect mode liquid crystal display cell. One of two opposing cell substrates, which confronts the photosensitive recording film, is made of a fiber plate including a plurality of optical fibers of which axes are perpendicular to the plane of the liquid crystal layer. By employing the optical fiber substrate, a high contrast and clean recording is ensured.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
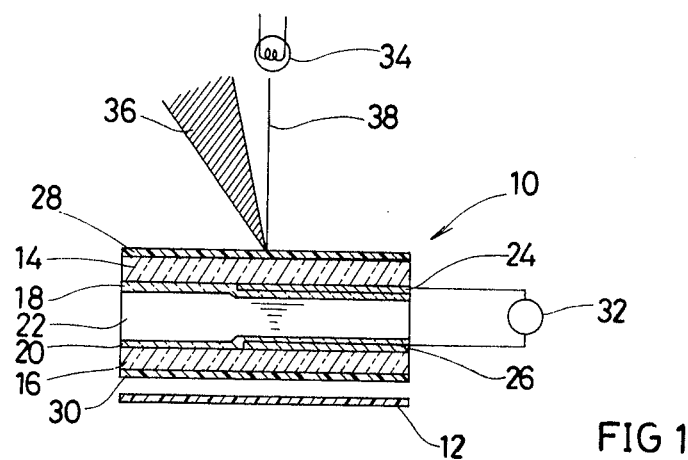
FIG. 1 is a sectional view of a basic construction of a liquid crystal display and record cell related to the present invention.

FIG. 1 shows a basic construction of the liquid crystal display and record cell developed by the present inventors.

The display and record cell comprises a twisted nematic field effect mode liquid crystal display cell 10 and a photosensitive recording member 12 disposed below the display cell 10. The twisted nematic field effect mode liquid crystal display cell 10 comprises a pair of glass substrates 14 and 16, orientation layers 18 and 20 formed on the glass substrates 14 and 16, respectively, a twisted nematic liquid crystal layer 22, transparent electrodes 24 and 26 formed on the glass substrates 14 and 16, respectively, and a pair of polarizers 28 and 30. A drive signal is applied from a driver circuit 32 to the transparent electrodes 24 and 26 to control the orientation of the liquid crystal molecules included in the twister nematic liquid crystal layer 22.

The twisted nematic liquid crystal layer 22 comprises a nematic liquid crystal or a long pitch cholesteric liquid crystal. The liquid crystal molecular orientation is rotated by 90° across the cell (between the glass substrates 14 and 16) to exhibit the twisted nematic orientation. The orientation is selectively modified at a desired portion by applying an electric field across the transparent electrodes 24 and 26. The thus formed modification of the orientation is observed through the use of the pair of polarizers 28 and 30. A light source 34 is provided for illuminating the twisted nematic field effect mode liquid crystal display cell 10, thereby recording the image generated by the display cell 10 on the photosensitive recording member 12.

The above-mentioned twisted nematic field effect mode liquid crystal display cell 10 inevitably shows the viewing angle dependency in the optical modulation characteristics. Moreover, the high contrast optical modulation is obtained only in a viewing region 36 which is deviated from the normal direction 38 of the glass substrate 14. Further, the viewing angle dependency becomes large when an effective drive voltage level is reduced due to a high multiplex drive system which is required in the liquid crystal display cell of the matrix electrode type. Thus, the high contrast recording can not be obtained on the photosensitive recording member 12 even when the light source 34 provides a recording beam along the normal direction 38.

The present invention directed to eliminating the above-mentioned problems. That is, an object of the present invention is to enhance the recording contrast in a recording system which employs the twisted nematic field effect mode liquid crystal display device. More specifically, in accordance with the present invention, at least one of the substrates 14 and 16 is made of a fiber plate including a plurality of optical fibers of which axes are perpendicular to the plane of the liquid crystal layer 22. The photosensitive recording member 12 is disposed on the side of the fiber plate substrate. The fiber plate functions to convert the high contrast viewing region toward the normal direction 38, and to substantially reduce the distance between the photosensitive recording member 12 and the image source of the optically modulated pattern, that is, the twisted nematic liquid crystal layer 22. Therefore, the high contrast recording is ensured.

Figure 2:
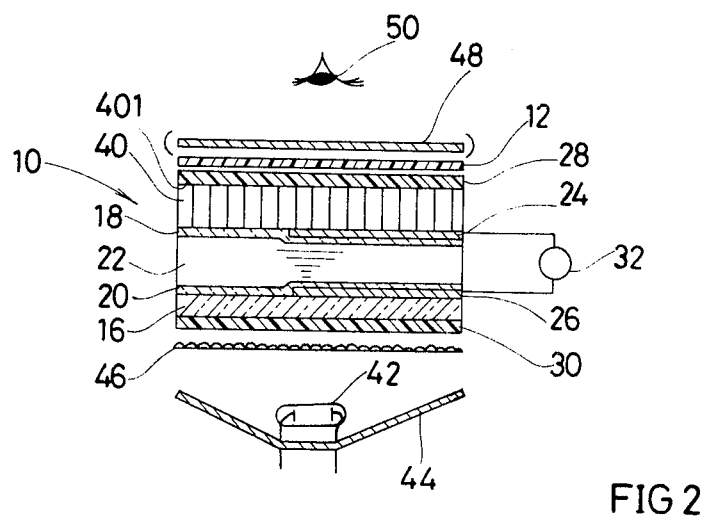
FIG. 2 is a sectional view of an embodiment of a liquid crystal display and record cell of the present invention.

FIG. 2 shows an embodiment of the liquid crystal display and record cell of the present invention. Like elements corresponding to those of FIG. 1 are indicated by like numerals.

The first glass substrate 14 (FIG. 1) is replaced by a fiber plate 40 including a plurality of optical fibers of which axes are perpendicular to the plane of the liquid crystal layer 22.

Such a fiber plate in the twisted nematic field effect mode liquid crystal display cell was described in the proceedings for the 26th Japanese Applied Physics Meeting, 1979, 30P-B-6, page 118, and in U.S. Pat. No. 4,183,630, TWISTED NEMATIC FIELD EFFECT MODE LIQUID CRYSTAL DISPLAY, issued on Jan. 15, 1980. As described in U.S. Pat. No. 4,183,630, the fiber plate 40 is effective to minimize the viewing angle dependency.

A flash light source 42 and a reflection mirror 44 are disposed below the glass substrate 16 to illuminate the twisted nematic field effect mode liquid crystal display cell 10 through a scattering plate 46. The photosensitive recording member 12 is disposed above the fiber plate 40 to record the image modulated by the twisted nematic field effect mode liquid crystal display cell 10. A shutter 48 is disposed above the photosensitive recording member 12 for shielding purposes. The shutter 48 is removably secured to the device so that the device operates as a display cell when the photosensitive recording member 12 and the shutter 48 are removed. In such a condition, an observer 50 recognizes the image modulated by the twisted nematic field effect mode liquid crystal display cell 10.

A drive signal is applied from the driver circuit 32 to the transparent electrodes 24 and 26 in order to activate the twisted nematic liquid crystal molecules included in the liquid crystal layer 22. The light beam derived from the scattering plate 46 is modulated while it passes through the twisted nematic field effect mode liquid crystal display cell 10 in accordance with the drive signal developed from the driver circuit 32. The modulated light beam is perpendicularly applied to the photosensitive recording member 12 because of the provision of the fiber plate 40. Further, an edge 401 confronting the polarizer 28 functions as an image light source and, therefore, the distance between the photosensitive recording member 12 and the image light source is substantially reduced. With such an arrangement, a clean and high contrast recording is ensured.

EXAMPLE

The glass substrate 16 is made of soda glass and has a thickness of 1 mm. The orientation layers 18 and 20 comprise a $SiO_2$ layer formed through the use of the electron beam evaporation technique. The $SiO_2$ layer has a thickness of about 500Å, and the surface thereof is treated by the rubbing method to form grooves which determine the orientation. The twisted nematic liquid crystal layer 22 comprises the nematic liquid crystal RO-TN-403 manufactured by Hoffman-La Roche Inc. including chloesteryl nonanoate by 0.1 wt %. The liquid crystal molecules are rotated by 90° between the fiber plate 40 and the glass substrate 16. The ITO transparent electrodes 24 and 26 are formed on the fiber plate 40 and the glass substrate 16, respectively, by depositing $InO_2$, to which $SnO_2$ is added by a little amount (5%), through the use of the electron beam evaporation technique. A preferred thickness of the transparent drive electrodes 24 and 26 is about 600Å. The fiber plate 40 is the fiber plate PH97HS manufactured by Cannon Kabushiki Kaisha. The fiber diameter is 100 μm, and a preferred thickness is 2 mm. The polarizers 28 and 30 are the linear polarizer L-82-18 manufactured by Sanritsu Electric Company Ltd. The photosensitive recording member 12 is the conventional silver salt film produced by Polaroid Corporation. The scattering plate 46 is the polyester scattering film, the flash light source 42 is a stroboscope light souce utilizing the xenon tube discharge, and the reflection mirror 40 is made of aluminum.

Although in the foregoing embodiment the silver salt film is employed as the photosensitive recording member 12, the conventional electrostatic copying system can be combined to the display cell 10. In such a system, the flash light source 42 must be disposed at the observer side, and the reflection mirror system is disposed at the position of the scattering plate 46 in FIG. 2 to provide the exposure beam path.

The flash light source 42 is not necessarily required when the photosensitive recording member 12 has the high sensitivity properly responding to the image light derived only from the ambience light beam. Further, an optical fiber light transmission system can be employed to introduce the ambience light toward the twisted nematic field effect mode liquid crystal display cell 10.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A liquid crystal display and record system comprising:
    first and second opposing substrates, said first substrate including a plurality of optical fibers, the axes of which are perpendicular to the plane of said first substrate;
    liquid crystal material sandwiched between said first and second opposing substrates;
    a first polarizer substantially juxtaposed to and above said first substrate;
    a second polarizer disposed below said second substrate;
    a photosensitive recording member substantially juxtaposed to said first polarizer; and
    a shutter means disposed above said photosensitive recording member, said shutter means and said photosensitive recording member both being removably secured to the liquid crystal display and record system.

2. A liquid crystal display and record system as in claim 1, wherein an illumination light source is disposed below said second polarizer.

3. A liquid crystal display and record system as in claim 1, wherein a scattering plate is disposed between said light source and said second polarizer.

* * * * *